Dec. 20, 1966   J. PETTERSEN   3,292,900
VIBRATION-DAMPING FIXING OF MOVING BLADES
FOR AXIAL-FLOW TURBO-MACHINES
Filed July 31, 1963   2 Sheets-Sheet 1
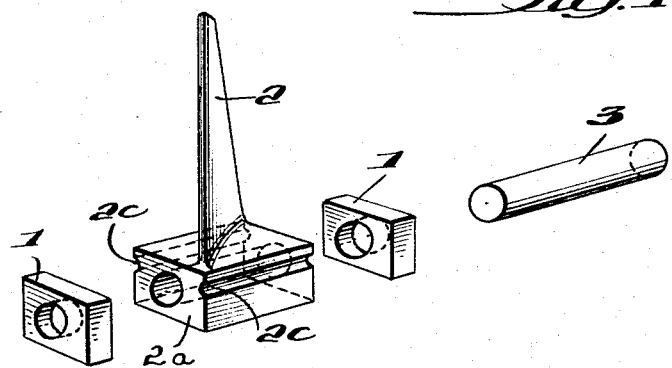
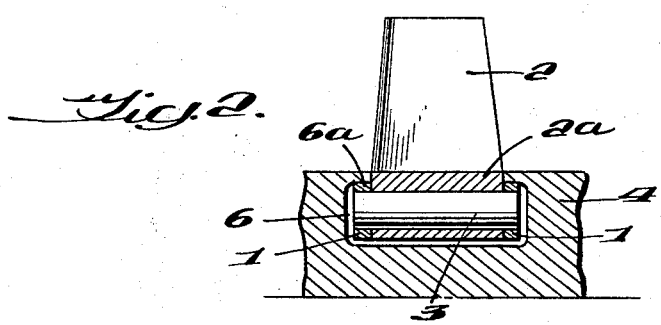
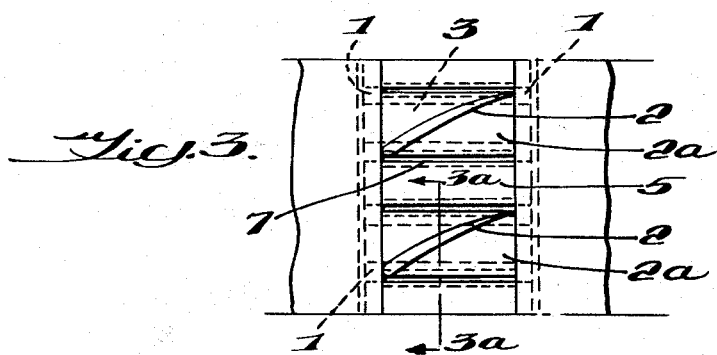
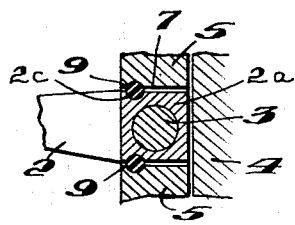
INVENTOR
Johan Pettersen
BY *Pierce, Scheffler & Parker*
ATTORNEYS

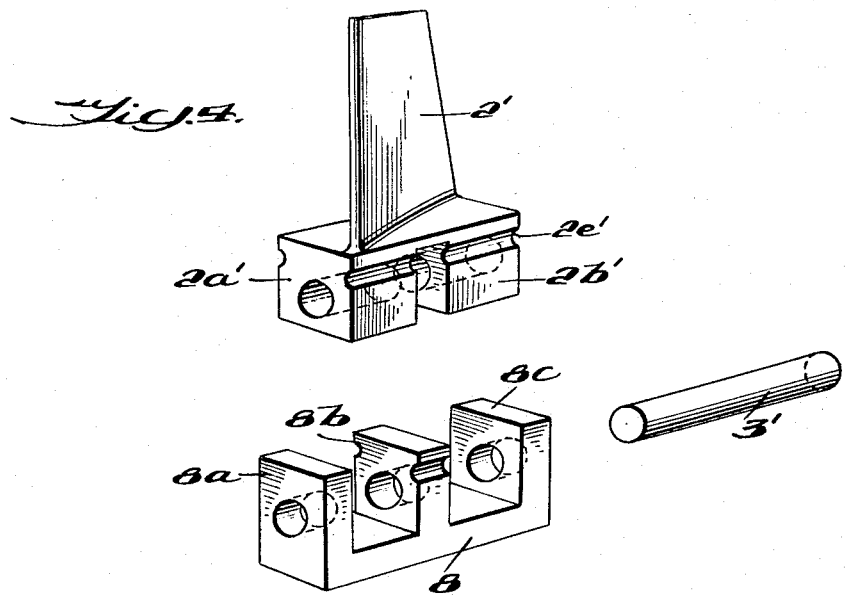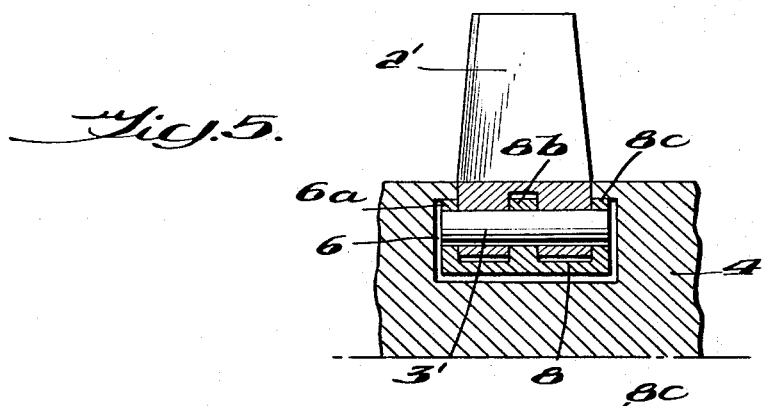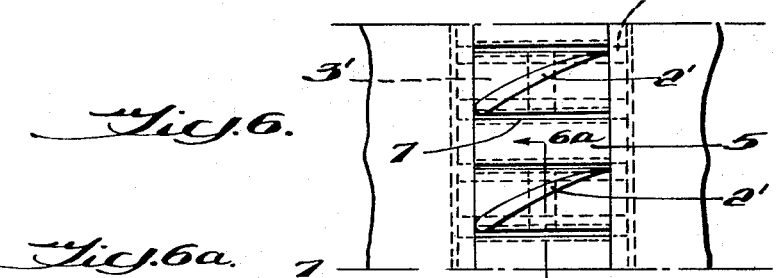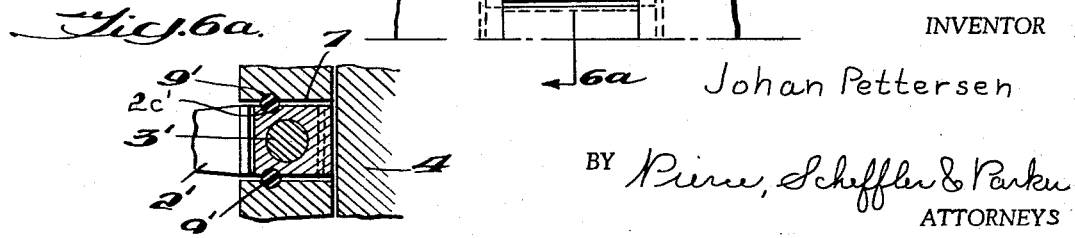

United States Patent Office 3,292,900
Patented Dec. 20, 1966

3,292,900
VIBRATION-DAMPING FIXING OF MOVING BLADES FOR AXIAL-FLOW TURBO-MACHINES
Johan Pettersen, Baden, Switzerland, assignor to Aktiengesellschaft Brown, Boveri & Cie., Baden, Switzerland, a joint-stock company
Filed July 31, 1963, Ser. No. 298,900
Claims priority, application Switzerland, Aug. 10, 1962, 9,511/62
4 Claims. (Cl. 253—77)

The present invention relates to a vibration-damping method of fixing moving blades for axial-flow turbomachines in undercut grooves on the rotor of the machine.

With rotors consisting of separate discs, the recognized procedure is to secure the moving blades with some freedom of movement by means of pins passing through the blade-root and through flanges on the rotor-discs. This method cannot be applied for drum-rotors, solid rotors and for the type consisting of a number of rims welded together to form a compact unit. In this case the blades are fitted in longitudinal or annular grooves and are usually rigidly secured. As these rotors are more stable, and thus better and cheaper, endeavors are made to find design solutions for them to which allow a limited movement of the blades.

The present invention has for its purpose to enable moving blades to be built into rotors with undercut grooves such as, for example, T-grooves for the purpose of damping vibration while still leaving freedom of movement. This objective is realized by means of packing-pieces which are fixed in the annular groove of the rotor and which serve as backing support for a pin arranged approximately parallel to the axis. To the latter pin is attached a moving blade at the blade root, which blade can turn through a small angle in the plane of rotation.

The blade-fixing in accordance with the invention is illustrated in the drawing with two constructional embodiments.

FIGS. 1 and 4 display in perspective the components of each embodiment, FIGS. 2 and 5 are axial cross-sections of each, FIGS. 3 and 6 are plan views of each and FIGS. 3a and 6a are sections of lines 3a—3a, 6a—6a of FIGS. 3 and 6.

As is to be seen from FIGS. 1 and 2, the packing-pieces 1 and the blade root 2a of moving blade 2 are drilled through. Pin 3 is firmly held by the packing-pieces, this being achieved by fitting the pieces, by soldering or in a similar manner. The blade is attached to the pin with some freedom of turning movement. These components are grouped together at erection to form a unit and this is inserted into an undercut groove 6 of rotor 4 with locking shoulders 6a so that pin 3 adapts a position approximately parallel to the axis of rotor rotation. At the same time the packing-pieces 1 take up a position in the enlarged, undercut part of the groove and act as backing-support during radial loading of the blade caused by centrifugal force. The undercut grooves may have any suitable configuration such as the T-groove illustrated in the drawings, it being only necessary that peripherally extending locking shoulders be established to interlock with the headed portion of the assembly shown in FIG. 2.

In the peripheral direction, the size of the packing-pieces is somewhat larger than the blade root. In this way the packing-pieces are fixed in the groove no matter whether they now provide mutual support for one another or whether an intermediate piece 5 is arranged between them as in FIG. 3. Conversely, on each side of the blade remains a narrow gap 7 which allows the blade to execute a small angle on the pin 3 in the plane of rotation. If desired, damping material can be inserted in the gaps 7, either completely filling them in the free space around the foot of the blades, or partially filling them such as illustrated, for example, in the drawing in FIG. 3a, the damping material being in the form of cylindrical cords of preferably a cross-linked elastomer which is capable of withstanding the high operating temperatures involved. The cords 9 are seated at each side of the blade root in confronting grooves 2c in the blade root and adjacent intermediate pieces 5.

The embodiment of the invention illustrated in FIGS. 4–6 involves a method of fixing which, in principle, is the same as that inherent in the previously described embodiment. However, in this second embodiment, the root portion of the blade 2' is composed of two sections 2a' and 2b' which are fitted into correspondingly sized spaces between the three legs 8a, 8b and 8c of a unitary packing piece 8. The pin which passes through the aligned openings in the blade root parts 2a' and 2b' and in the three legs of the packing piece 8 is indicated at 3'. This embodiment has the advantage over that disclosed in FIGS. 1–3 in that the bending of pin 3' will be smaller than that of pin 3 and it can thus be of smaller dimensions.

On the occurrence of blade-vibrations, friction forces arise between the pin and the blade attached to it, these forces damping the vibrations and thus reducing their frequency. Through suitably chosen tolerances between pin and blade-boring, the friction forces can be predetermined. Should damping in excess of this value be necessary, vibration-damping material as shown in FIG. 6a can be inserted in the gaps 7 between the blade-root and the two adjacent parts lying in the peripheral direction, this being either a blade-root or an intermediate piece 5. As illustrated, the vibration damping material is constituted by cords 9' similar to the cords 9 described with respect to the embodiment of FIGS. 1–3, the cords 9' being inserted in confronting grooves 2c' in opposite faces of the blade root and adjacent intermediate pieces 5.

The blade-fixing in accordance with the invention which is applicable to rotor discs, has the advantage that no axial drillings are required in the rotor. Outside the rotor, the separate components are formed into easily checked groups and are fed into the annular groove in this condition in the manner previously explained; this substantially simplifies and cheapens the assembly work.

I claim:
1. In combination, a rotor for an axial flow type turbo-machine, said rotor including at least one peripherally extending undercut groove for receiving a row of blades which are individually mounted in said groove, each said blade including a bladed portion extending radially outward from said groove and a root portion located within said groove, said root portion including a single bore extending therethrough in a direction transverse to the plane of the rotor groove, a single pin extending through said bore and projecting from the ends thereof, and a packing piece secured to each projecting end portion of said pin, said packing pieces being located in the undercut portions of said rotor groove thereby to retain said blade in said rotor groove, and said bladed portion of said blade having a width not exceeding the width of said rotor groove at the surface of the rotor so as to enable said blade to pivot slightly about the pin axis in the direction of said groove to dampen blade vibration.

2. A bladed rotor assembly as defined in claim 1 for an axial flow type turbo-machine wherein the side face of said root portion of each blade is provided with a groove in which is received an insert of vibration-damping material.

3. A bladed rotor assembly as defined in claim 1 for an axial flow type turbo-machine and which further includes non-bladed spacer blocks located in said groove between the root portions of adjacent blades and which are retained in place by the under-cut portions of the groove.

4. A bladed rotor assembly as defined in claim 1 for an axial flow type turbo-machine wherein said packing pieces correlated to each blade and pin are established by a single packing structure having three parallel legs projecting from a base portion which is seated in the rotor groove, the two outer legs of said packing structure being located respectively adjacent the side faces of the root portion of the blade and beneath the under-cut portion of the rotor groove, and the intermediate leg being inserted itno a slot formed in the root portion which divides the latter into two sections, said pin being inserted through aligned bores in the two sections of the root portion and in the three legs of the packing structure.

References Cited by the Examiner

UNITED STATES PATENTS

| | | | |
|---|---|---|---|
| 943,348 | 12/1909 | Hodgkinson | 253—77 |
| 980,732 | 1/1911 | Anderson. | |
| 1,015,313 | 1/1912 | Green | 253—77 |
| 1,362,074 | 12/1920 | Baumann | 253—77 |
| 2,310,412 | 2/1943 | Flanders | 253—77.4 |
| 2,805,838 | 9/1957 | Pickup | 253—77 |
| 2,936,155 | 4/1960 | Howell | 253—77.4 |

FOREIGN PATENTS 753,229   7/1956   Great Britain.

JOHN F. CAMPBELL, *Primary Examiner.*

J. D. HOBART, *Examiner.*